(12) United States Patent
Howarth, Jr.

(10) Patent No.: US 10,322,800 B2
(45) Date of Patent: Jun. 18, 2019

(54) GYRO POD FLYING DEVICE

(71) Applicant: David G. Howarth, Jr., Spring, TX (US)

(72) Inventor: David G. Howarth, Jr., Spring, TX (US)

( * ) Notice: Subject to any disclaimer, the term of this patent is extended or adjusted under 35 U.S.C. 154(b) by 361 days.

(21) Appl. No.: 15/295,697

(22) Filed: Oct. 17, 2016

(65) Prior Publication Data
US 2017/0106975 A1   Apr. 20, 2017

Related U.S. Application Data

(60) Provisional application No. 62/242,802, filed on Oct. 16, 2015.

(51) Int. Cl.
*B64C 39/00* (2006.01)

(52) U.S. Cl.
CPC .................. *B64C 39/001* (2013.01)

(58) Field of Classification Search
CPC ..... B64C 17/00; B64C 27/20; B64C 29/0091; B64C 39/001
See application file for complete search history.

(56) References Cited

U.S. PATENT DOCUMENTS

| | | | | |
|---|---|---|---|---|
| 3,350,035 A * | 10/1967 | Schlieben | ............... | B64C 29/02 244/34 R |
| 3,633,849 A * | 1/1972 | Kling | ...................... | B64C 27/20 244/12.2 |
| 4,505,346 A * | 3/1985 | Mueller | .................. | B62D 57/04 180/21 |
| 4,537,372 A * | 8/1985 | Forizs | ................. | B64C 29/0033 244/12.4 |
| 6,295,154 B1 * | 9/2001 | Laor | ..................... | G02B 6/3512 359/223.1 |
| 6,402,088 B1 * | 6/2002 | Syrovy | ................... | B64C 27/18 244/10 |
| 6,976,899 B1 * | 12/2005 | Tamanas | ................ | A63G 29/02 446/178 |
| 7,905,447 B2 * | 3/2011 | Stroud | .................... | B64C 27/10 244/17.23 |
| 8,464,978 B2 * | 6/2013 | Yim | ........................ | B64C 27/20 244/17.23 |
| 9,067,667 B2 * | 6/2015 | Yan | ........................... | B64C 1/00 |
| 2008/0054121 A1 * | 3/2008 | Yoeli | ..................... | B64C 1/1415 244/12.1 |
| 2010/0224723 A1 * | 9/2010 | Apkarian | ............... | A63H 27/12 244/65 |

* cited by examiner

*Primary Examiner* — Justin M Benedik
(74) *Attorney, Agent, or Firm* — Law Office of Jeff Williams PLLC; J. Oliver Williams

(57) ABSTRACT

A device for the transportation of people and cargo is described. The device is a gyro-rotating flying device including a pod structure configured to transport one or more contents. The pod structure includes a gyro pod to contain the one or more contents. An engine is included to propel the pod structure into flight. A power supply provides energy for the engine and a control unit. The control unit allows a user the ability to regulate operation of the engines. Manipulation of the engine adjusts the orientation of the pod structure and engine around the gyro pod. The gyro pod is configured to remain level during flight.

13 Claims, 4 Drawing Sheets

GYRO POD FLYING DEVICE

CLAIM OF PRIORITY

This application claims the benefit of U.S. Provisional Application No. 62/242,802, filed Oct. 16, 2015. The information contained therein is hereby incorporated by reference.

BACKGROUND

1. Field of the Invention

The present application relates generally to the transportation industry, and in particular to a flying pod for transporting individuals and packages between locations.

2. Description of Related Art

The transportation industry consists of multiple types of modes of transportation. Commonly known are modes of private transportation and modes of public transportation. Both modes are used to transport individuals between various locations. Public transportation typically refers to a shared passenger transport service which is available for use by the general public. Common examples are taxicabs, busses, rail, and so forth. Public transportation is typically subsidized by municipalities, states, and city governments. Private transportation typically refers to a mode of transportation where the mode of transportation is the property of the passenger. Some common examples are vehicles and small aircraft. Commercial aircraft can be thought of as a mass transit offered by the private sector for profit.

Each mode of transportation has its limitations. Private transportation modes are very common because it offers the flexibility for the user to go to any destination. However, in larger cities, traffic congestion is a major concern. Freeways are often gridlocked by the commuting traffic of the day. Public transportation is more limited in its acceptance and use, depending on the area, but is often seen as an alternative to try and alleviate the commuting traffic congestion. Public transportation is often limited and difficult to incorporate into existing infrastructure without great expense. In order to lessen the costs to infrastructure associated with public transportation and to alleviate congestion from private modes commuting each day, an airborne method of transportation is needed. This airborne transportation differs from commercial traffic options that only transport passengers between major cities or municipalities.

Although airborne transportation is possible, a new method that allows for the convenience of private modes of transportation via the air is needed. Although great strides have been made with respect to various transportation modes, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
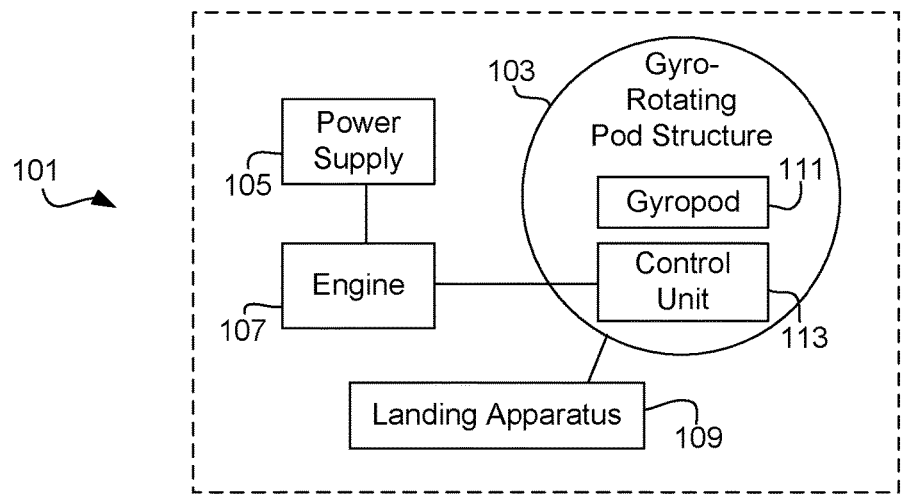
FIG. 1 is a schematic of a gyro pod flying device according to an embodiment of the present application

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with conventional modes of transportation. Specifically, the gyro pod flying device of the present application is configured to provide personalized mode of transportation to one or more passengers/operators via airborne flight between two or more locations. The gyro pod flying device is configured to operate as a VTOL, Vertical Take Off and Landing, aircraft without the need of a runway. Use of the gyro pod flying device is configured to alleviate traffic congestion from commuting and is designed to provide more flexible travel destinations within a particular metropolitan area than conventional commercial traffic and public transportation. These and other unique features of the device are discussed below and illustrated in the accompanying drawings.

The device and method will be understood as to its operation, from the accompanying drawings, taken in conjunction with the accompanying description. It should be understood that various components, parts, and features of the device may be combined together and/or interchanged with one another, all of which are within the scope of the present application, even though not all variations and particular embodiments are shown in the drawings. It should also be understood that the mixing and matching of features, elements, and/or functions is expressly contemplated herein so that one of ordinary skill in the art would appreciate from this disclosure that the features, elements, and/or functions of one embodiment may be incorporated into another embodiment as appropriate, unless otherwise described.

Referring now to the drawings wherein like reference characters identify corresponding or similar elements in form and function throughout the several views. The device and method of the present application includes the use of a plurality of engines located in various radial positions from a gyro-rotating pod structure. The engines are coupled to one or more rigid arms radially extending away from the pod structure. The engines and pod structure are configured to rotate around the gyro pod so as to incite motion in any desired direction. In other words, by varying the orientation of the engines, the direction of travel of the flying gyro pod is air is adjusted. The gyro pod within the pod structure is permitted to move freely within any radial rotation. The flying gyro pod and engine configuration is similar to that of a gyroscope wherein movement of the arms and pod structure is designed to move the engines with multiple degrees of freedom to control flight.

Referring now to FIG. 1 in the drawings, a gyro pod flying device 101 is illustrated. Device 101 includes a gyro-rotating pod 103, a power supply 105, at least one engine 107, and a landing apparatus 109. Device 101 is configured to transport either/or both people and cargo (i.e. contents) within a central gyro pod 111. Pod structure 103 is configured to surround a portion of gyro pod 111 so as to allow for the orientation of engines 107 to control flight while permitting gyro pod 111 to remain at a desired level orientation. A user within gyro pod 111 has access to a control unit 113 configured to communicate with engines 107 to regulate motion of device 101 in the air and on the ground.

Figure 2:
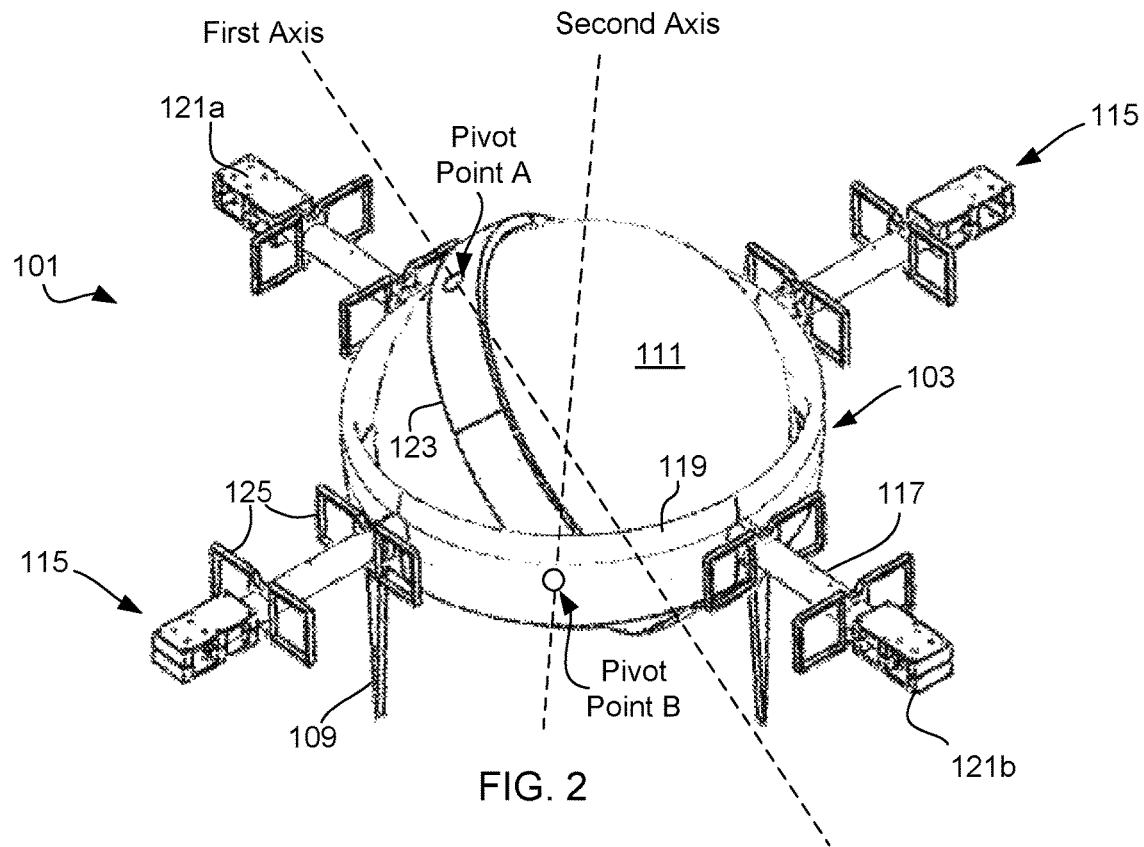
FIG. 2 is an exemplary perspective view of the gyro pod flying device of FIG. 1.
Figure 3:
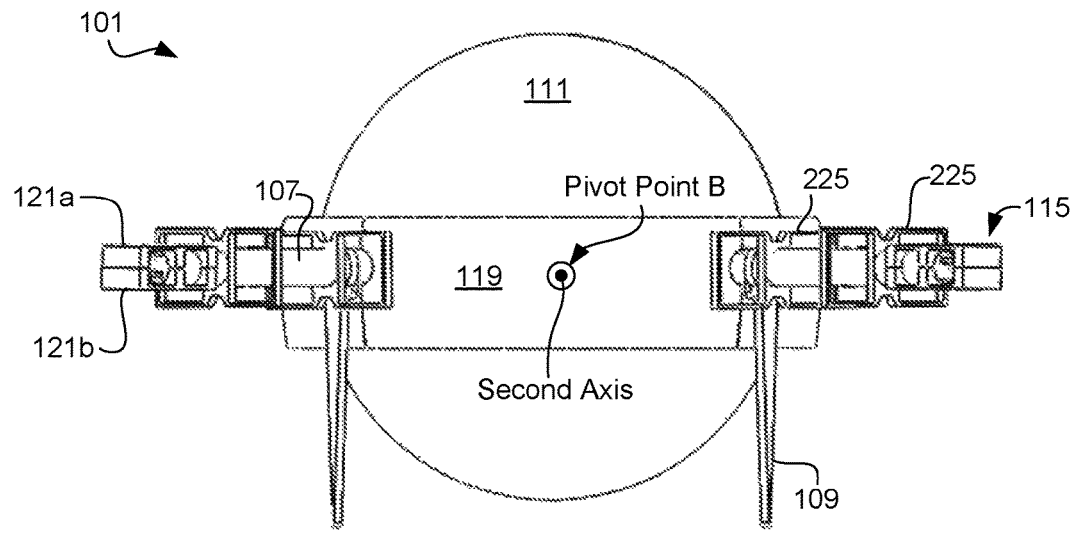
FIG. 3 is a side view of the gyro pod flying device of FIG. 2.
Figure 4:
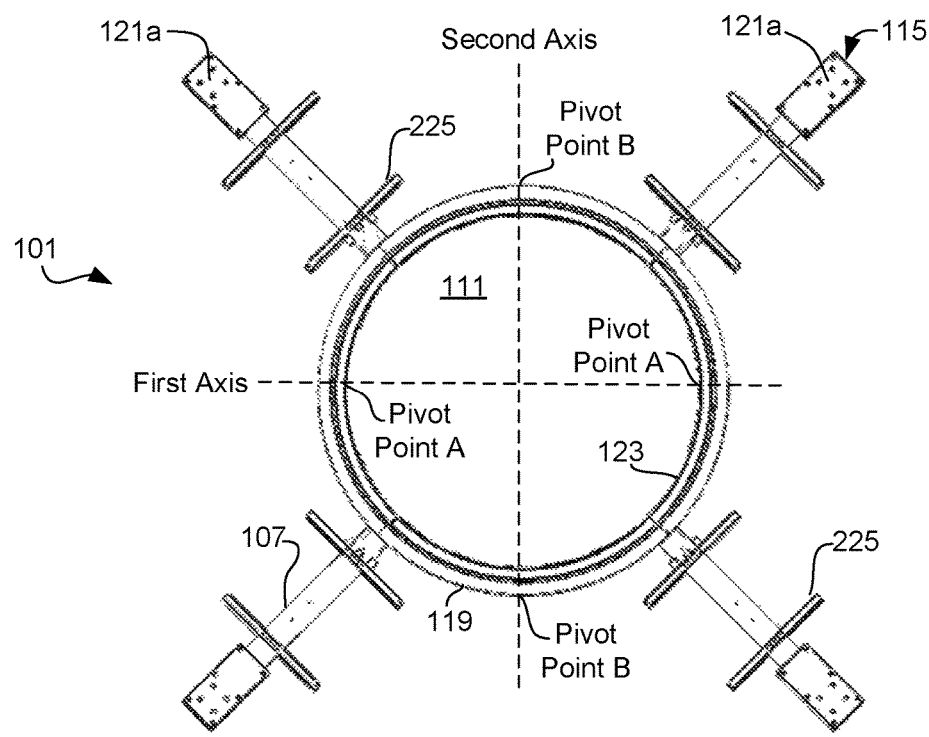
FIG. 4 is a top view of the gyro pod flying device of FIG. 2.

Referring now to FIGS. 2-4 in the drawings, an exemplary gyro pod flying device is illustrated. For clarity, power supply 105 and engine 107 are not illustrated with respect to FIGS. 2-4 to permit a better view of pod structure 103. Engine 107 can be of various sized and types. It is understood that engine 107 is ideally a propeller driven motor system. Speeds of rotation may vary depending on the type and weight of contents within gyro pod 111. Engines 107 may be interchanged to account for size and weight requirements.

Engines 105 are configured to couple to pod structure 103 at any location, including the location of engine mount 115. Mount 115 is located at a distal end of an arm 117 and is configured to secure engine 105 to pod structure 103. Arm 117 extends from outer band 119 of pod structure 103. By locating engine 105 and mount 115 at a distal end of arm 117, sufficient space is realized to permit for the broadest diameter for the propellers on engine 107. As seen in FIG. 2, more than one engine is used in this embodiment. Device 101 may use one or more engines 105 to generate sufficient lift to transport gyro pod 111.

Engine mount 115 includes a mounting plate 121 configured to accept one or more fasteners for the mounting of engine 107 to pod structure 103. One or more mounting plates 121 may be used per mount 115. As seen in FIGS. 2-4, each mount 115 includes an upper and a lower mounting plate 121a, 121b. This allows for multiple engines 107 to be coupled to each mount 115, and therefore each arm 117. Lift is increased as a result. Rotation and curvature of the propellers may be adjusted as necessary to permit this stacking configuration. It is understood that if only a single engine is used either plate 121a or 121b may be removed from mount 115.

Arm 117 is configured to extend out from an outer band 119. Pod structure 103 includes outer band 119, arm 117 and an inner pivoting band 123. This configuration of pod structure 103 is configured to permit for the free rotation of pod structure 103 relative to gyro pod 111. As engine 107 is regulated, pod structure 103 pivots and reorients itself around gyro pod 111. Ideally arms 117 are rigidly secured to outer band 119. Although rotation of arm 117 are contemplated about its longitudinal axis, it is generally considered to not be necessary given the dual axis nature of pod structure 103. Additionally, engines 107 may be selectively pivoted or rotated independent of pod structure 103. For example, mounts 115 may include the ability to selectively pivot. The pivot being controlled via control unit 113 and one or more control motors. This allows for the user to individually select an optimal orientation for the pod structure 103 independent from the optimal engine orientation.

Pod structure 103 is configured to include two rotation axes, namely a first axis and a second axis. Gyro pod 111 is located at least partially within inner band 123. Gyro pod 111 is rotatably coupled to inner band 123 at opposing pivot points (Pivot Point A—only one side shown), forming a first axis. This allows gyro pod 111 the ability to rotate 360 degrees relative to inner band 123. Inner band 123 is separately rotatably coupled to outer band 119 at opposing pivot points (Pivot Point B—only one side shown) forming a second axis. This allows inner band 123 the ability to rotate 360 degrees relative to outer band 119. Combined, structure 103 is able to rotate fully around gyro pod 111 while gyro pod 111 maintains a level orientation. Gyro pod 111 maintains an unlimited range of motion relative to pod structure 103.

Gyro pod is configured to include any number of storage organizers, seats, and compartments to permit the transportation of individuals, cargo, packaging . . . (i.e. contents). A hatch may be used to ingress and egress gyro pod 111. Control unit 113 is internally located within gyro pod 111 for operational control of engines 107. Regulation of engine(s) 107 induce lift, speed, and rotation of pod structure 103. The selective orientation of engines 107 can permit gyro pod 103 to travel forward, sideways, upward, and downward.

Power supply 105 may be any type of stored power unit, most likely electric in nature. Combustion powered engines are considered as well, however an electric powered system is preferred. Engines 107 are designed to run off of electrical energy from batteries stored within power supply 105. Each engine 107 has a limited range and time of operation. A power regulator is used to regulate the discharge and recharge of one or more batteries and control unit 113. Many types of power supplies are contemplated. In FIGS. 2-4, power supply 105 is located externally to pod structure 103, and in particular to arm 117. It is preferred that power supply 105 is located at a position near engine 107. A single power supply 105 may be used to power one or more engines 107. In FIGS. 2-4, each engine or engine pair is shown as using either one or two power supplies.

Power supply 105 is configured to be secured to pod structure 103 for flight. This is done in one of two ways. First a harness 125 is configured to couple to power supply 105 and secure it to arm 117. Harness 125 is a separate and individual item. Harness 125 may be alternatively integrally formed into landing apparatus 109. In either configuration, power supply 105 is supported by one or more harnesses 125/landing apparatus 109. As illustrated, power supply 105 may pass through a portion of harness 125/landing apparatus 109.

Landing apparatus 109 is configured to extend from pod structure 103 and elevate gyro pod 111 from a surface when not in flight. When on the ground, gyro pod is meant to be suspended so as to not touch the ground. This helps to prevent unnecessary damage to gyro pod 111 during landing. Landing apparatus 109 is configured to be a rigid protrusion that does not retract. Retracting methods are contemplated but are more complicated and increase weight. Retracting methods are not needed for device 101 to function.

It is understood that any number of arms 117 may be used. Engines 107 are configured to be radially spaced around pod structure 103 for best control. Additionally, inner band 123 and outer band 119 may be configured to have an airfoil outer contour to assist in generating lift as device 101 translates through the air. This is equally applicable for arm 117.

Figure 5:
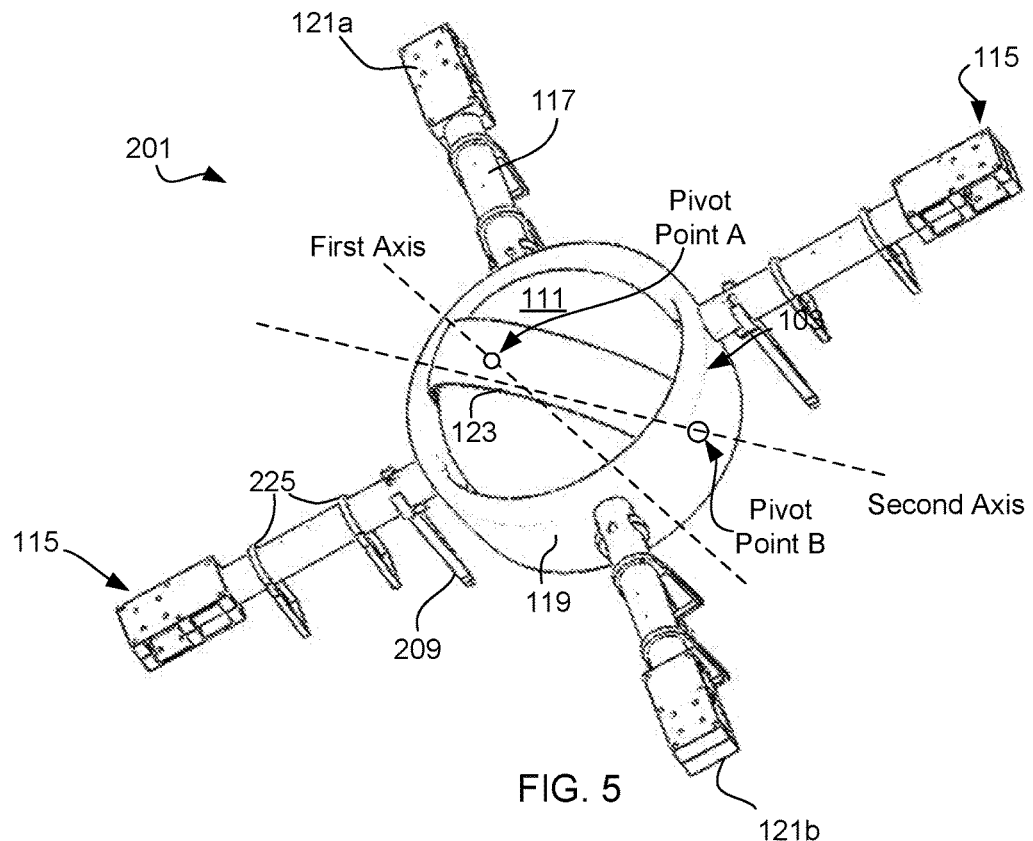
FIG. 5 is a perspective view of an alternative embodiment of the gyro pod flying device of FIG. 2.
Figure 6:
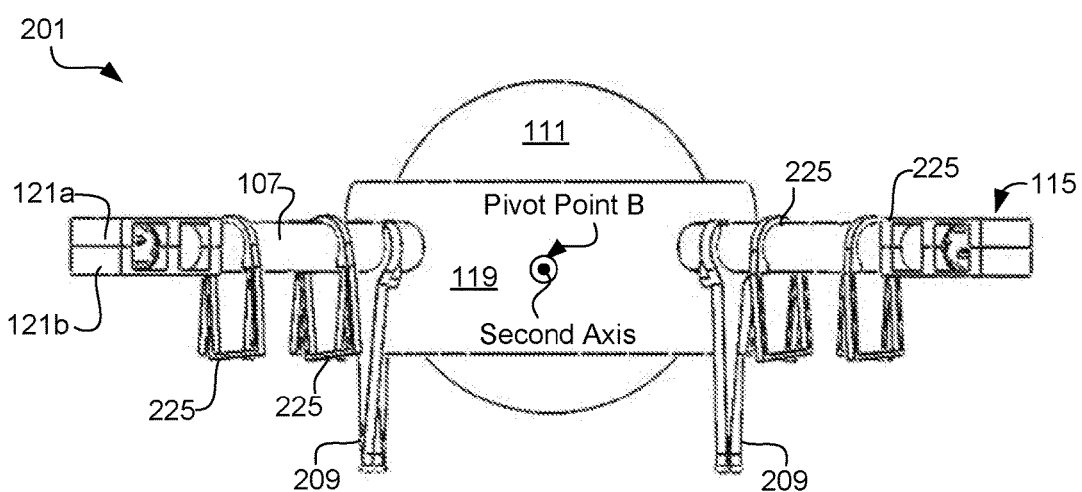
FIG. 6 is a side view of the gyro pod flying device of FIG. 5.
Figure 7:
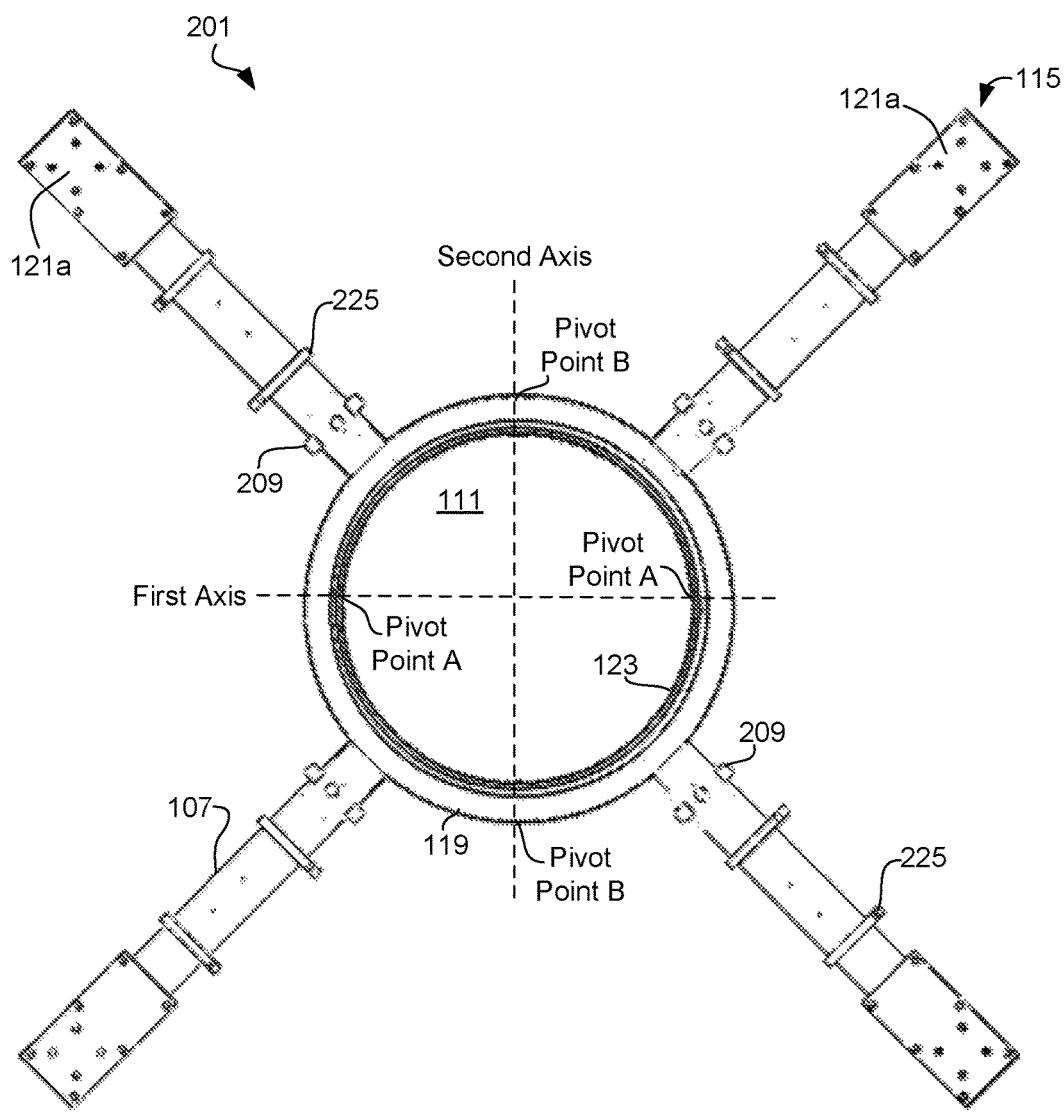
FIG. 7 is a top view of the gyro pod flying device of FIG. 5.

Referring now to FIGS. 5-7 in the drawings, an alternative embodiment of device 101 is illustrated. Gyro pod flying device 201 is similar in form and function to Device 101 wherein like reference characters identify corresponding or similar elements in form and function throughout the several views. Device 201 differs primarily in the form of harness 225 used to support power supply 105 and that of landing apparatus 209 in how it interacts with the harness. Harness 225 is still configured to externally mount power supply 105, except herein harness 225 is completely detached from landing apparatus 209. Harness 225 is similar in form and function to harness 125, but harness 225 locates the power supply beneath arm 117. Landing apparatus 209 is similar in form and function to landing apparatus 109 except that apparatus 209 is not integrated with harness 225. All other components of device 201 operate similarly to that of device 101.

The spherical shape of gyro pod 103 is not herein limiting. Gyro pod 103 is contemplated to have various types of shapes. It is desired that the shape of gyro pod 103 be designed to minimize drag and increase performance. One or two occupants is an ideal capacity for device 101.

Engines 107 may be either rigidly attached to mounts 115 or selectively removable at different times. For example, a rigidly attached engine 107 remains coupled to mount 115 regardless of whether it has enough energy to continue operation. These engines require re-fueling at when on the ground before continuing operation. This is typically seen with conventional engines. The range of device 101 is therefore dependent upon the limited range of the collective engines 107. Re-fueling is contemplated during flight as customarily seen in military aviation but may not always be practical.

Other embodiments may include a detachable engine 107. In these embodiments, it is contemplated that each engine can detach from the respective mount 115. In a conventional sense, when using electrical power sources (i.e. batteries), this feature may allow for a quicker turnaround time when landing. Batteries may be rechargeable and interchangeable themselves if engine 107 is not removable however. Even in this embodiment of engines 107, the range of gyro pod 103 is limited to the overall range of the collective engines 107.

A different feature of device 101/201 is contemplated wherein the re-fueling or recharging of engines 107 may be performed in flight. Typically, this is thought to include additional flying vehicles to transport the power/fuel source necessary. This is required if the engine is integrally coupled to mounts 115. However, where engines 107 are detachable, each engine is configured to selectively and automatically detach from mount 115 to make way for another engine 107. This is performed in many different ways but in general, engines 107 may be configured to operate and fly independently to that of device 101. Detached engines 107 may fly on their own accord between a recharging station and device 101. When fuel or power is low, a fresh engine is flown to device 101 and interchanged automatically with the engine running low on power or fuel. To make flight possible, each engine may be configured to have wings that may extend and retract as necessary. The control systems of device 101 is configured to regulate the interchanging of engines 107 to ensure that sufficient power is provided to gyro pod 103 to ensure continued flight. In this way, gyro pod 103 is no longer restricted in range to the range of the collective engines.

In other embodiments, device 101/201 may include a recharging surface that absorbs lightwaves in the infrared/microwave frequencies using a fractal rectenna design and an attachment sleeve for permitting the removal and securing of engines. The rectenna used to convert harvested solar energy into DC electrical energy. These engines/batteries may be interchanged during flight or while grounded. The sleeve is configured to support each engine and hold it secure in a proper and desired orientation relative to the torid wing. The torid wing is configured to pivot around the gyro pod via an axle. The axle is configured to couple to a portion of the gyro pod and the torid wing. The axle may be permitted to translate along a surface of torid wing 305 to permit the rotation of engines around the gyro pod. This design is configured to permit all the degrees of freedom for operation as described with the prior embodiments.

A key feature of devices 101/201 is their ability to land on different types of surfaces since the bottom half of the sphere is non-porous and buoyant. For example, each may be configured to land on land (i.e. hard surface), but also may be configured to land on liquid surfaces (i.e. lakes, bodies of water). Deployable airbags and other floatation devices may be selectively deployed or incorporated into the design of the wing or engines to ensure floatation. Additionally, the shape of the gyro pods may generate enough displacement to allow floatation without the need of any external floatation devices.

Devices 101/201 include a number of advantages, such as at least the following: 1) personalized intra-city flight to 47000 worldwide airport destinations; 2) use results in decreased congestion on roadways and noise pollution; 3) flight controls and operation similar to that of a gyroscope; and 4) interchangeability of the batteries at all airport locations make range unlimited; 5) has ability to display safety alerts, messages, or advertisements on the exterior of the pod-sphere to the people on the ground; 6) has the ability to act as a holodeck, the passenger has full range walk-to-run motion in all 4 directions, this will allow use of a Virtual Reality unimpeded; and 7) the ability to recharge batteries via fractal rectenna.

It is evident by the foregoing description that the subject application has other significant benefits and advantages. The present system and method is amenable to various changes and modifications without departing from the spirit thereof. The particular embodiments disclosed above are illustrative only, as the system and method may be modified and practiced in different but equivalent manners apparent to those skilled in the art having the benefit of the teachings herein. It is therefore evident any alterations, modifications, and all such variations are considered within the scope and spirit of the application. It is apparent that a system and method with significant advantages has been described and illustrated.

What is claimed is:

1. A gyro-rotating flying device, comprising:
   a pod structure configured to transport one or more contents, the pod structure including a gyro pod to contain the one or more contents, an inner pivoting band, and an outer band, the gyro pod directly coupled to the inner pivoting band to permit rotation of the inner pivoting band about the gyro pod along a first axis, the inner pivoting band directly coupled to the outer band to permit rotation of the outer band about a second axis, the second axis being perpendicular to the first axis;
   an engine coupled directly to an arm, the arm directly affixed to the outer band, the engine and arm moving with the outer band;
   a power supply in communication with the pod structure and the engine to provide a source of electrical power; and
   a control unit configured to operate the engine;
   wherein operation of the engine adjusts the orientation of the pod structure and engine around the gyro pod, the gyro pod remaining level.

2. The device of claim 1, wherein the gyro pod is configured to maintain an unlimited range of motion relative to the pod structure.

3. The device of claim 1, wherein the gyro pod is configured to rotate independent of the pod structure and the engines.

4. The device of claim 1, wherein the engine is rigidly coupled to the pod structure.

5. The device of claim 1, wherein the engine is pivotally coupled to the pod structure.

6. The device of claim 1, wherein the pod structure includes an arm for supporting the engine.

7. The device of claim 1, further comprising:
   a power supply configured to provide electrical energy to the engine and control unit.

8. The device of claim 1, further comprising:
   a landing apparatus configured to extend from the pod structure and elevate the gyro pod from a surface when not in flight.

9. The device of claim 8, wherein the power supply is coupled to the landing apparatus, the landing apparatus configured to secure and locate the power supply relative to the pod structure.

10. The device of claim 1, wherein the power supply is coupled to the arm of the pod structure.

11. The device of claim 1, further comprising:
    a harness configured to secure and support the power supply.

12. The device of claim 11, wherein the harness is coupled to the arm of the pod structure.

13. The device of claim 11, wherein the harness is integrally formed within a landing apparatus.

* * * * *